Patented May 10, 1949

2,469,861

UNITED STATES PATENT OFFICE 2,469,861

CHEWING GUM BASE

Wallace P. Cohoe, New York, N. Y., assignor to American Chicle Company, Long Island City, N. Y., a corporation of New Jersey No Drawing. Application March 2, 1946, Serial No. 651,631

6 Claims. (Cl. 99—135)

The invention is a new and improved chewing gum base comprising of materials of a nutritious character so that a chewing gum made therefrom may be not only swallowed, but digested.

There have been many suggestions in the past which look towards the central idea of this invention. However, there have been many undetermined factors necessary to the production of an article acceptable to the general public, and therefore, a number of patents have been issued on the subject and these may be divided into two classes. First, there are those which do not provide a permanent chew but suggest a chewing gum base which slowly dissolves and becomes swallowed. Second, those patents which provide a chewing gum base which comprises resins which may be swallowed but do not consist of nutritious materials. The present invention overcomes such difficulties.

By means of the present invention there is provided a digestible chewing gum, and one in which the insoluble and indigestible content of the standard chewing gum of today is replaced by a material which is substantially insoluble in the mouth but which, when swallowed, is substantially digested. It is desirable to impart to the chew as much as possible of the elasticity which exists in the standard chewing gum of today.

The invention is characterized by the use with a prolamine base, namely the gliadin of wheat, the hordein of barley and the zein of maize, and preferably wheat-gluten and zein jointly, rendered substantially fat and sugar free, together with materials which in combination with the prolamine, produce a permanent chew, with a sufficient "body" having a desired and controlled hydrophylic power, and of adequate resistance to decomposition.

It became evident in my work that both fats and sugars incorporated within the prolamine base tend to disperse the same so as to impair a permanent chew. By itself, zein is elastic when plasticized with water at temperatures above 50° C. At the temperature of the human body, however, it loses its elasticity, becoming granular and crumbly. Plasticizing materials commonly used to modify zein at ordinary temperatures were investigated, but all of them were found to be of a character improper for food uses. As a result of my preliminary investigation, it was found that a permanent chew could be produced from dried wheat gluten, and that this chew would have characteristics of regular gum. In order to stiffen such base, zein in dried powder form was incorporated on a rubber mill with vacuum dried wheat gluten in the proportion of one part of dried zein to four parts of dried wheat gluten. Water containing 10% of glycerin was employed to plasticize the dry materials and was used in the proportion of forty parts or more thereof to one hundred parts of the combined prolamines. In working on a rubber mill, it became evident that only sufficient work should be done thereupon to secure good and even incorporation of materials employed. When too much mastication was performed the mass lost its elastic character.

It was found also that for every one hundred parts of the combined prolamines, about twenty parts of dibasic calcium phosphate, which possesses nutrient value, could be employed to advantage in order to give body to the chew. Amounts of dibasic calcium phosphate in excess of this proportion did not appear to be desirable.

As ascertained in the preliminary investigation, sugars incorporated with a mass such as described above, tended to disperse the same when chewed, so that no permanent cud resulted. In the same manner it was found that fats acted in a like manner and a fat free wheat gluten also provides more body than that which contained fats. It also was determined by me that gelatin syrup, made in the usual way, may be incorporated with prolamines to obtain a permanent chew. The addition of this ingredient also prevents putrefaction of the base.

Notwithstanding the fact that sugars incorporated with the base as described above tend to disperse the same when chewed, the small proportion of sugar in a sugar syrup required to impart a tolerable sweetening to the gum affords little difficulty because the sugar proportion is small and is very quickly released in mastication of the gum. Also, it is entirely feasible to use the base for the centers of gum nuggets coated with sugar, forming "candy coated gum," because such coating is friable, breaks away upon the initial chewing of the gum, and is absorbed in the mouth before it can have any material effect as to dispersion of the prolamine.

The initial chew was quite elastic and rubbery, while the final chew due to the swelling of the prolamines upon taking up water from the saliva, became soft and somewhat voluminous. To overcome the first condition, soya lecithin was incorporated with the previously described mass. This material modified the initial chew in a satisfactory manner, and the dicalcium phosphate or its recognized equivalents, minimizes the effect of swelling of the prolamines, as chewing proceeds.

It was found possible to flavor the base with flavoring materials of the ester class and oil of betula was employed for that purpose, successfully. A chewing gum base, therefore, was made of which the following are examples:

1.

| | | |
|---|---|---|
| Wheat gluten | gms | 80 |
| Zein | gms | 20 |
| Dicalcium phosphate | gms | 20 |
| Soya lecithin, preferably oil free | gms | 10 |
| 10% glycerine-water solution | mls | 70 |

2.

| | | |
|---|---|---|
| Wheat gluten | gms | 80 |
| Zein | gms | 20 |
| Dicalcium phosphate | gms | 20 |
| Soya lecithin, preferably oil free | gms | 10 |
| Gelatine syrup | gms | 75 |
| 10% glycerine-water solution | mls | 70 |

3.

| | | |
|---|---|---|
| Wheat gluten | gms | 100 |
| Dicalcium phosphate | gms | 20 |
| Soya lecithin, preferably oil free | gms | 10 |
| 10% glycerine-water solution | mls | 70 |

It will be understood that the proportions specified in the above examples are approximate in the sense that they are not critical and they may be varied. It will also be understood that the recognized equivalents of dicalcium phosphate and soya lecithin may be employed, and that any suitable non-toxic plasticizer may be employed as a substitute for the water-glycerine plasticizer of the examples.

I claim:

1. A permanent-chew, but digestible, chewing gum, substantially fat free and substantially insoluble in the mouth, comprising a prolamine base, dibasic calcium phosphate, lecithin, and glycerine-water solution sufficient to bring said dry materials into plastic form.

2. A permanent-chew, but digestible, chewing gum, substantially fat-free and substantially insoluble in the mouth, comprising a prolamine base, dibasic calcium phosphate, lecithin, glycerine-water solution, and gelatine syrup, the last two constituents being sufficient to bring said materials into plastic form, and the gelatine syrup being adapted to substantially retard decomposition of the said chewing gum.

3. A permanent-chew, but digestible, chewing gum, substantially fat-free, and substantially insoluble in the mouth, comprising a prolamine base, 80–100 gms., about 20 gms. dibasic calcium phosphate, about 10 gms. lecithin, and about 70 mls. 10% glycerine-water solution.

4. A permanent-chew, but digestible, chewing gum, substantially fat-free, comprising a prolamine base, dibasic calcium phosphate, lecithin, and glycerine-water solution, the glycerine-water solution being adapted to bring the said ingredients into plastic form and the dibasic calcium phosphate being adapted to control the composition against undue swelling and softening.

5. A permanent-chew, but digestible, chewing gum, substantially fat-free and substantially insoluble in the mouth and containing the constituents recited in claim 4, in combination with gelatine syrup as a constituent coacting with the glycerine-water solution in bringing the composition into plastic form, said gelatine syrup being adapted to substantially control the composition against decomposition.

6. A permanent-chew, but digestible chewing gum, substantially fat-free and substantially insoluble in the mouth and containing the constituents of claim 1, the prolamine base consisting of wheat gluten and zein in the proportion of one part of zein to four parts of wheat gluten.

WALLACE P. COHOE.

REFERENCES CITED

The following references are of record in the file of this patent:

UNITED STATES PATENTS

| Number | Name | Date |
|---|---|---|
| 1,700,387 | Stetson | Jan. 29, 1929 |
| 2,154,482 | Weber | Apr. 18, 1939 |
| 2,197,719 | Conner | Apr. 16, 1940 |
| 2,203,436 | Kertess | June 4, 1940 |